Feb. 4, 1958 A. C. SCINTA 2,821,732
WINDSHIELD WIPER
Filed Sept. 20, 1954
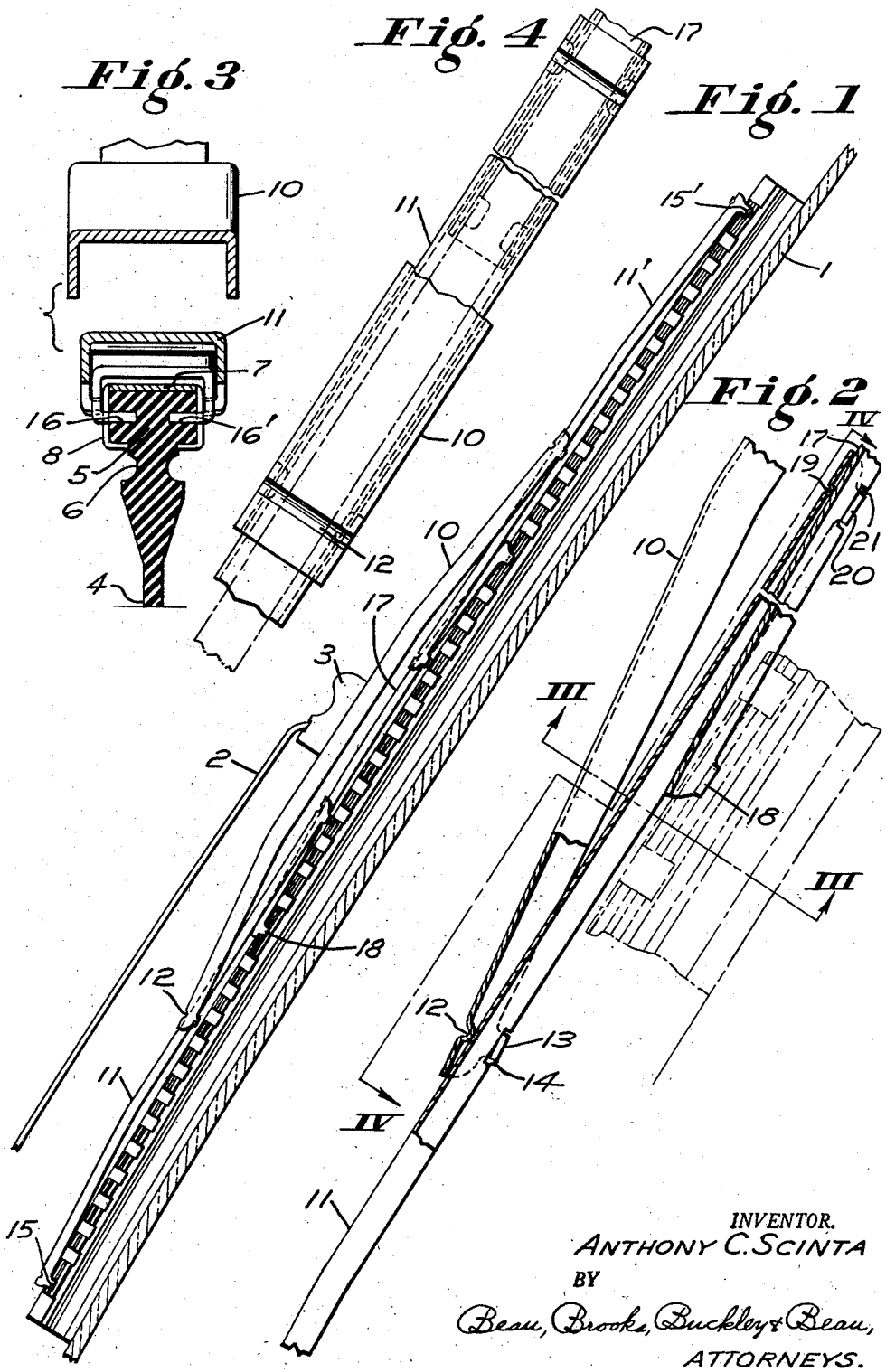
INVENTOR.
ANTHONY C. SCINTA
BY
Beau, Brooks, Buckley & Beau,
ATTORNEYS.

United States Patent Office 2,821,732
Patented Feb. 4, 1958

2,821,732

WINDSHIELD WIPER

Anthony C. Scinta, Buffalo, N. Y., assignor to Trico Products Corporation, Buffalo, N. Y.

Application September 20, 1954, Serial No. 456,934

12 Claims. (Cl. 15—245)

This application relates generally to the window cleaner art, and more specifically to a new and useful wiper blade construction particularly adapted for the wiping of curved window surfaces.

With the advent of the curved windshield and the utilization of increasingly sharp corners where the glass is turned back along the side of the vehicle, it has become increasingly difficult to construct a blade which will provide an effective wiping action at all times and under all conditions. Not only must the blade conform to the varying curvature of the window surface, but as the blade is moved around the sharply curving crest of the window glass it must bend quite sharply, particularly at its outer end. Also, when the blade is traveling at high speed it must flex and bend extremely rapidly. Consequently, the provision of wiping pressure in an amount sufficient to ensure a firm wiping contact with the glass throughout the length of the blade at all times and without deforming the blade at any point such as to destroy its effectiveness at that point, presents a problem of considerable difficulty.

This problem is complicated by the effect of lateral drag on the blade body, which is particularly evident when the glass is only slightly wetted and when the blade is being pulled back toward the center of the window and upwardly over the sharply curved crest of the glass, at which point the arm pressure on the blade increases. At such times the lateral drag is of sufficient force to cause the blade body to deform and roll over to an extent such that often the wiping lip no longer serves as a fulcrum and the side of the blade body is pressed against the window glass, which increases the drag forces.

Present day wiper blades for curved window surfaces commonly comprise an elongated flexible blade body laterally reinforced by a backing member which compels surface conformance thereof, together with a pressure distributing structure carrying the blade body and including a rigid primary yoke member or bridge adapted for attachment to an actuating arm and a pair of rigid secondary yoke members or rockers pivoted on the outer ends of the primary yoke member, the secondary yoke members being secured to the blade body, either directly or indirectly through the backing member, at longitudinally spaced points therealong. Such an arrangement enables flexing of the blade body in a direction generally normal to the surface of the glass, but possesses certain disadvantages in that, for example, the secondary yoke members, particularly when the lateral drag on the blade body is fairly strong, tend to twist out of alinement and deform the blade body in a manner adversely affecting the wiping performance of the blade. In addition, the secondary yoke members are relatively short in length and do not bend sharply fast enough for use on the more extreme curved window surfaces.

Also, it has previously been proposed to pivot the secondary yoke members at a point spaced inwardly from the longitudinal mid point thereof, thereby achieving a lever differential providing heavier wiping pressure on the intermediate portion of the blade body relative to the ends thereof in order to avoid deformation of the more lightly supported blade body ends. However, this lever differential accentuates the aforesaid twisting action.

Accordingly, it is a primary object of this invention to provide a pressure distributing structure for a flexible wiper blade body which will enable conformance thereof to a curved window surface and provide effective wiping pressure throughout the length of the blade body, and which will tend to maintain the blade body in longitudinal alinement.

In addition, it has been found that when such prior art blades reach around the realtively sharp crest of the glass the secondary yoke members, and particularly the one at the outer end of the blade, tend to lift the intermediate blade body portion away from the wnidow surface, thereby precluding effective wiping at this point.

Accordingly, it is also a primary object of this invention to provide a wiper blade construction enabling conformance to a curved window surface while maintaining the complete length of the blade body in wiping contact with the window surface at all times, even when the blade body end section is reaching around a sharply curved window part, and which provides an extremely rapid surface conforming action.

A wiper blade constructed in accord with the instant invention is characterized by the provision, in combination with a blade unit of the type including an elongated flexible blade body having a wiping lip along one longitudinal margin thereof and a laterally substantially rigid backing along the oposite longitudinal margin thereof, of a pressure distributing structure including primary pressure distributing means in the form of first yoke means adapted for attachment to an actuating arm, secondary pressure distributing means including rigid levers pivotally connected intermediate their ends to said first yoke means at longitudinally spaced points therealong, means connecting one end of said levers to the opposite end portions of said blade unit, and tertiary pressure distributing means including rigid second yoke means interconnecting the other ends of said levers and pivotally supporting the same and having longitudinally spaced points of connection to the intermediate portion of said blade unit, whereby each of said levers transmits wiping pressure to an end portion of said blade unit and, through said second yoke means, to spaced intermediate points along said blade unit.

The foregoing and other objects and advantages of a wiper blade in accord with the instant invention will become clearly apparent upon a perusal of the ensuing detailed description, taken together with the accompanying drawing forming a part thereof and wherein:

Fig. 1 is a view in side elevation of a wiper blade in accord with the instant invention installing in operative position relative to a window surface;

Fig. 2 is a fragmentary detail view of the blade of Fig. 1, with certain parts being shown in section and with parts broken away for ease of illustration;

Fig. 3 is a transverse sectional view taken about along line III—III of Fig. 2; and Fig. 4 is a fragmentary plan view taken about on line IV—IV of Fig. 2, with parts broken away for ease of illustration.

The wiper blade of the instant invention is adapted to wipe a window surface 1, which can be either a curved surface as shown or a relatively flat surface, and is carried at the outer end of a conventional actuating arm 2 by means of a conventional coupler 3 adapted for detachable connection to arm 2. Arm 2 is oscillated by the usual motor, not illustrated, and preferably comprises an inner end section mounted on the usual rockshaft and an outer end section pivoted to the inner end section and spring-biased toward the surface of window 1, such as shown for example in Fig. 1 of U. S. Patent 2,659,923.

The wiper blade comprises a flexible blade unit and a novel pressure distributing structure therefor. The blade unit can be of conventional form adapted for the wiping of curved window surfaces, comprising for example an elongated flexible blade body having a wiping lip 4 along one longitudinal margin thereof and an enlarged backing portion 5 along its opposite margin, the wiping lip 4 and the backing portion 5 being joined by a flexible neck portion 6. The blade body is laterally supported and urged into surface conformance by a laterally substantially rigid metal backing strip 7 formed along each side thereof with a series of depending arms 8 inturned under the shoulders provided beneath the enlarged backing portion 4 on each side of the neck portion 6.

In accord with the instant invention, the blade unit is carried by a pressure distributing structure including primary pressure distributing means adapted for attachment to an actuating arm and having oppositely directed parts providing spaced points of support for the secondary pressure distributing parts, which primary means can be of either resilient or rigid construction. In the preferred embodiment illustrated herein, the primary means comprises a rigid first yoke or bridge member 10 carrying at about the mid point thereof the attaching clip 3 and pivotally connected, adjacent its opposite ends, to secondary parts in the form of rigid levers 11 and 11', respectively.

Yoke 10 is formed adjacent its opposite ends with detents 12 providing bearing surfaces for the levers 11 and 11', and with depending, inturned feet 13 engaged in notches 14 formed in the levers 11 and 11'. It will be noted that notches 14 are formed in levers 11, 11' at points offset from the center thereof and toward the inner ends thereof, whereby yoke 10 is connected to levers 11 and 11' at points spaced slightly inwardly from the longitudinal mid point thereof. Levers 11 and 11' are connected adjacent their outer ends to the opposite end portions of the blade unit, as by means of depending, inturned feet 15 and 15', respectively, engaged in grooves 16, 16' extending lengthwise of the blade body backing portion 5 on opposite sides thereof.

At their inner ends, levers 11 and 11' are pivotally connected to a tertiary pressure distributing means in the form of a rigid second yoke or bridge member 17 which is arched over the center portion of the blade unit beneath the larger first yoke 10. Yoke 17 is connected at its opposite ends to the blade unit, as by the depending, inturned feet 18 engaging the blade body recesses 16, 16'. Levers 11 and 11' are each formed at their inner ends with detents, such as that shown at 19, providing bearing surfaces engaging yoke 17 on opposite sides of the mid point thereof, and with depending inturned feet engaged in notches formed on opposite sides of the mid point of yoke 17, as illustrated at 20 and 21, respectively, in Fig. 2.

Each of the members 10, 11, 11' and 17 is arched to permit flexing of the blade unit, in a direction normal to the window surface, intermediate the points of pressure application thereto. In addition, the members 10, 11, 11' and 17 are of inverted channel form and interfit whereby to enable nesting thereof for greater compactness and flexibility.

With this arrangement, the wiping pressure provided by actuating arm 2 is transmitted by the yoke 10 to the levers 11 and 11' which in turn transmit wiping pressure both directly to the opposite ends of the blade unit and indirectly through the yoke 17 to longitudinally spaced points intermediate the opposite ends of the blade unit. The secondary yoke 17 thereby transmits wiping pressure from the levers to the blade unit intermediate portion, and it transmits the wiping pressure from each lever to longitudinally spaced points along the blade unit intermediate portion. Therefore, yoke 17 ties together the inner ends of the levers 11 and 11' and ties them down at longitudinally spaced points, whereby yoke 17 is an anchor member for both levers, and the levers have two common fulcrum supports in yokes 10 and 17.

As a result, if one of the levers 11, 11', in reaching around about a sharply curved window surface, tends to lift upwardly away from the surface of window 1 adjacent its inner end, the pressure exerted on yoke 17 by the other lever, and transmitted by the yoke 17 to the blade unit at a point between the opposite ends of the one lever, will resist such lifting action, thereby maintaining effective wiping contact throughout the length of the blade.

In other words, any tendency of one lever 11 or 11' to lift the yoke 17 in a direction causing the wiping lip 4 to separate from the glass 1 is resisted by the force exerted on yoke 17 by the other lever, which force is exerted by yoke 17 on the inner end of the one lever and on the intermediate portion of the blade unit at spaced points including a point intermediate the ends of the one lever. Also, it is believed that the leverage arrangement illustrated, providing relatively heavy pressure on the intermediate portion of the blade unit as compared with the ends thereof, assists in resisting any such lifting tendency, and if desired yoke 10 can be connected to levers 11 and 11' at points spaced even further inwardly from the longitudinal mid point thereof.

In addition, with a construction in accord with the instant invention the inner ends of the levers 11 and 11' are tied together by the yoke 17 which is common thereto and which normally is urged thereby against the blade unit. Because it is held down against the blade unit by the levers, yoke 17 tends to maintain its longitudinally alined position and tends to maintain the levers and the blade unit in longitudinal alinement, thereby resisting movement of these parts out of alinement by lateral drag forces.

Also, it will be noted that levers 11 and 11' are relatively long, each of them spanning almost half the length of the blade unit, and they pivot around the fixed pivot connections provided at their inner ends. Thus, the yoke 17 provides a fixed pivot support, apart from the blade unit, at the inner ends of the levers, and the levers have sliding connection with the blade unit only at their outer ends, which arrangement provides for extremely rapid flexing of the blade unit because of the quick acting levers and thereby enables the blade unit to conform to a sharply curved surface while moving thereacross at high speed. This is readily distinguished from the aforesaid prior art arrangement of relatively short secondary yokes spanning the opposite end portions of the blade unit and having both ends of the yokes slidably connected to the blade unit.

Accordingly, a wiper blade constructed in accord with the instant invention accomplishes the aforesaid objects and represents a significant contribution to the art. While the invention has been disclosed in but a single, preferred embodiment thereof, it is not necessarily limited to such embodiment and its scope is to be defined by the appended claims.

Having fully disclosed and described this invention, together with its mode of operation, what is claimed as new is:

1. In a wiper blade adapted for curved window surfaces and having an elongated flexible blade body, a pressure distributing structure comprising primary pressure distributing means including first yoke means adapted for attachment to an actuating arm, secondary pressure distributing means for transmitting wiping pressure from said first yoke means to the opposite end portions of said blade body including rigid levers pivoted intermediate their ends on said first yoke means at longitudinally spaced points therealong and having connection with said blade body end portions, and tertiary pressure distributing means for transmitting wiping pressure from said secondary means to a portion of said blade body intermediate said end portions thereof including rigid anchor yoke means interconnecting said levers and attached to said intermediate blade body portion at spaced points therealong.

2. In a blade adapted for the wiping of curved window surfaces and having an elongated flexible blade body, a pressure distributing structure comprising primary pressure distributing means adapted for attachment to an actuating arm and having pressure applying parts spaced apart lengthwise of said blade body, secondary pressure distributing means having sliding connection with the opposite end portions of said blade body and including levers pivotally connected intermediate their ends to said primary pressure applying parts, whereby said secondary means transmit wiping pressure from said primary means to the opposite end portions of said blade body, and tertiary pressure distributing means for transmitting wiping pressure from said secondary means to the intermediate portion of said blade body including a rigid yoke member having connection with said blade body intermediate portion at points spaced apart lengthwise thereof, said levers having separate fixed pivot supports on said rigid yoke member for transmitting wiping pressure therethrough to said intermediate blade body portion and for providing an extremely rapid flexing action of the blade body end portions.

3. In a wiper blade adapted for use on curved window surfaces and having an elongated flexible blade body supported by a laterally substantially rigid backing of a type urging surface conformance of said blade body, a pressure distributing structure comprising, first yoke means extending lengthwise of said blade body and adapted for attachment to an actuating arm, a pair of rigid levers pivoted intermediate their ends on said first yoke means at longitudinally spaced points therealong, means connecting one end of said levers to the opposite end portions of said blade body, the other ends of said levers being spaced apart lengthwise of said blade body, and anchor yoke means spanning an intermediate portion of said blade body and tying together the other ends of said levers, said anchor yoke means being connected to said blade body.

4. A wiper blade adapted for use on curved window surfaces comprising, in combination with a blade unit including an elongated flexible blade body and a laterally substantially rigid backing compelling surface conformance thereof, a pressure distributing structure including first yoke means adapted for attachment to an actuating arm, a pair of rigid levers pivotally connected intermediate their ends to the opposite end portions of said first yoke means, means connecting the outer ends of said levers to the opposite end portions of said blade unit, rigid second yoke means common to said levers and independently pivotally supporting the inner ends thereof off said blade unit, and means connecting said second yoke means to said blade unit at spaced points therealong intermediate the opposite ends thereof, said levers thereby providing for rapid flexing of the blade unit end portions.

5. A wiper blade for curved window surfaces comprising, in combination with a blade unit having an elongated flexible blade body laterally reinforced by a backing urging surface conformance of said blade body, first yoke means spanning an intermediate portion of said blade unit and adapted for attachment to an actuating arm, rigid second yoke means spanning a lesser intermediate portion of said blade unit, said first yoke means overlying said second yoke means, means connecting the opposite end portions of said second yoke means to said blade unit at spaced points therealong, and rigid levers spanning the opposite end portions of said blade unit and having their outer end portions connected thereto, said levers being pivoted intermediate their ends on the opposite end portions of said first yoke means for receiving wiping pressure therefrom and having their inner end portions pivoted on said second yoke means at spaced points therealong for transmitting wiping pressure therethrough to said blade unit.

6. A wiper blade adapted for use on curved window surfaces comprising, in combination with a blade unit having an elongated flexible blade body and laterally substantially rigid backing means flexible in a direction enabling surface conformance of said body, a pressure distributing structure supporting said blade body and including first yoke means adapted for attachment to an actuating arm, rigid second yoke means spanning an intermediate portion of said blade unit and connected to said intermediate portion at longitudinally spaced points therealong, and rigid lever means pivoted on the opposite end portions of said first yoke means, said lever means being connected at one end thereof to the opposite end portions of said blade unit and pivoted at the other end thereof on said second yoke means at longitudinally spaced points intermediate the points of connection of said second yoke means to said blade unit, whereby wiping pressure is transmitted by each of said lever means directly to an opposite end portion of said blade unit and indirectly through said second yoke means to longitudinally spaced points intermediate said blade unit end portions.

7. A wiper blade adapted for the wiping of curved window surfaces comprising, a blade unit having an elongated flexible blade body and laterally substantially rigid backing means sustaining said blade body against lateral distortion while compelling surface conformance thereof, and a pressure distributing structure supporting said blade unit including a first rigid yoke member adapted for attachment to an actuating arm, separate rigid lever members pivoted intermediate their ends on said first yoke member adjacent the opposite ends thereof, the outer ends of said lever members being connected to said blade unit adjacent the opposite ends thereof for transmitting wiping pressure directly thereto from said first yoke member, and a second rigid yoke member spanning an intermediate portion of said blade unit and having its opposite ends connected thereto at longitudinally spaced points therealong, the inner ends of said lever members being independently pivoted on said second yoke member for transmitting wiping pressure from said primary yoke member indirectly through said second yoke member to said blade unit intermediate portion at said longitudinally spaced points therealong.

8. A wiper blade adapted for use on curved window surfaces comprising, in combination with a blade unit of the type having an elongated flexible blade body and a laterally substantially rigid backing compelling surface conformance thereof, a pressure distributing lever arrangement including primary pressure distributing lever means adapted for attachment to an actuating arm, a pair of secondary pressure distributing lever means pivotally supported intermediate the ends thereof on said primary lever means adjacent the opposite ends thereof, means connecting said secondary lever means to the opposite end portions of said blade unit, whereby wiping pressure is transmitted to said blade unit end portions, and means connecting said secondary lever means to an intermediate portion of said blade unit for transmitting wiping pressure thereto, said last-named means including tertiary pressure distributing lever means spanning said intermediate blade unit portion and connected thereto at longitudinally spaced points therealong, said secondary lever means being pivotally supported on said tertiary lever means at spaced points therealong.

9. A wiper blade adapted for use on curved window surfaces comprising, in combination with a blade unit having an elongated flexible blade body and means laterally reinforcing said body and urging the same into surface conformance, a pressure distributing structure comprising first yoke means adapted for attachment to an actuating arm, a pair of rigid levers extending outwardly from the opposite ends of said first yoke means into engagement with the opposite end portions of said blade unit, means pivotally connecting said first yoke means to each of said levers at a point inwardly offset from the longitudinal mid point thereof to thereby provide a pair of relatively long lever arms extending outwardly from said first yoke means to said blade unit end portions, and a rigid second yoke connected adjacent its opposite ends to longitudinally spaced points along the intermediate portion of said blade unit, the inner ends of said levers being pivotally supported on said second yoke at spaced points therealong, whereby wiping pressure is transmitted by each of said levers directly to one of said blade unit end portions and indirectly, through said second yoke, to spaced points along said blade unit intermediate portion, said levers providing rapid flexing of said blade unit end portions, and whereby said second yoke resists movement of said levers out of longitudinal alinement and resists movement of the inner ends of said levers away from the window surface.

10. A blade adapted for wiping curved window surfaces comprising, in combination with a blade unit having an elongated flexible blade body and laterally substantially rigid backing means urging surface conformance thereof, a pressure distributing structure therefor including first yoke means spanning an intermediate portion of said blade unit and having means for attachment to an actuating arm, a pair of rigid levers pivoted intermediate their ends on said first yoke means adjacent the opposite ends thereof, means connecting the outer ends of said levers to the opposite end portions of said blade unit, rigid second yoke means positioned beneath said first yoke means and spanning a lesser intermediate portion of said blade unit than said first yoke means, the inner ends of said levers being pivoted on said second yoke means at longitudinally spaced points therealong, and means connecting the opposite ends of said second yoke means to said blade unit, whereby wiping pressure is transmitted by said levers directly to the opposite end portions of said blade unit and indirectly through said second yoke means to intermediate points longitudinally spaced along said blade unit, said yoke means and said levers being arched over said blade unit and being of interfitting inverted channel form, whereby to enable flexing of said blade unit for conformance thereof to a curved window surface.

11. In a blade adapted for the wiping of curved window surfaces and having an elongated flexible blade body, a pressure distributing structure comprising primary pressure distributing means adapted for attachment to an actuating arm and having pressure applying parts spaced apart lengthwise of said blade body, secondary pressure distributing means having connection with the opposite end portions of said blade body and including levers pivotally supported intermediate their ends on said primary pressure applying parts, whereby said secondary means transmit wiping pressure from said primary means to the opposite end portions of said blade body, and tertiary pressure distributing means for transmitting wiping pressure from said secondary means to the intermediate portion of said blade body including a rigid yoke member having connection with said blade body intermediate portion at points spaced apart lengthwise thereof, said levers being separately pivoted on said rigid yoke member adjacent the longitudinal mid point thereof for transmitting wiping pressure therethrough to said intermediate blade body portion.

12. A wiper blade adapted for use on curved window surfaces comprising, in combination with a blade unit having an elongated flexible blade body and means laterally reinforcing said body and urging the same into surface conformance, a pressure distributing structure comprising first yoke means adapted for attachment to an actuating arm, a pair of rigid levers extending outwardly from the opposite ends of said first yoke means into engagement with the opposite end portions of said blade unit, said first yoke means pivotally supporting each of said levers at a point inwardly offset from the longitudinal mid point thereof to thereby provide a pair of relatively long lever arms extending outwardly from said first yoke means to said blade unit end portions, and a rigid second yoke connected adjacent its opposite ends to longitudinally spaced points along the intermediate portion of said blade unit, the inner ends of said levers being pivotally supported on said second yoke at spaced points therealong adjacent the longitudinal midpoint thereof, whereby wiping pressure is transmitted by each of said levers directly to one of said blade unit end portions and indirectly, through said second yoke, to spaced points along said blade unit intermediate portion, and whereby said second yoke resists movement of said levers out of longitudinal alinement and resists movement of the inner ends of said levers away from the window surface.

References Cited in the file of this patent

UNITED STATES PATENTS

| | | |
|---|---|---|
| 2,667,656 | Oishei | Feb. 2, 1954 |

FOREIGN PATENTS

| | | |
|---|---|---|
| 1,051,298 | France | Sept. 16, 1953 |
| 1,062,783 | France | Dec. 9, 1953 |